United States Patent [19]

Bojarski et al.

[11] Patent Number: 5,474,320

[45] Date of Patent: Dec. 12, 1995

[54] TRAILER

[75] Inventors: John C. Bojarski, Green Bay; Thomas M. Gerondale, Wrightstown, both of Wis.

[73] Assignee: SSAC & Association, L.L.C., Wausau, Wis.

[21] Appl. No.: 68,648

[22] Filed: Jun. 1, 1993

Related U.S. Application Data

[63] Continuation-in-part of Ser. No. 917,822, Jul. 21, 1993, Pat. No. 5,320,376.

[51] Int. Cl.$^6$ .................................................. B62D 13/06
[52] U.S. Cl. ...................... 280/442; 280/460.1; 280/700; 280/717; 280/DIG. 14
[58] Field of Search ................................ 280/442, 460.1, 280/DIG. 14, 700, 717, 723, 789

[56] References Cited

U.S. PATENT DOCUMENTS

| | | | |
|---|---|---|---|
| 1,524,136 | 1/1925 | Kapferer et al. | 280/442 |
| 1,712,063 | 5/1929 | Agramonte | 280/442 |
| 2,083,049 | 6/1937 | Byron | 280/442 |
| 2,498,779 | 2/1950 | Winchester | 280/405.1 |
| 2,644,697 | 7/1953 | Peterson | 280/442 |
| 2,674,463 | 4/1954 | Peterson | 280/442 |
| 2,674,464 | 4/1954 | Peterson | 280/442 |
| 3,108,821 | 10/1963 | Krauss . | |
| 3,149,858 | 9/1964 | Gilbert | 280/442 |
| 3,211,467 | 10/1965 | Siddall . | |
| 3,337,234 | 8/1967 | Ishizuka | 280/99 |
| 3,734,538 | 5/1973 | Humes | 280/426 |
| 3,880,439 | 4/1975 | Wolter . | |
| 4,084,833 | 4/1978 | Mohrbacker et al. . | |
| 4,345,775 | 8/1982 | Merrifield . | |
| 4,405,147 | 9/1983 | Horsman et al. | 280/443 |
| 4,463,966 | 8/1984 | Stoddard | 280/442 |
| 4,770,430 | 9/1988 | Lange . | |
| 4,792,148 | 12/1988 | Hintz . | |
| 4,824,135 | 4/1989 | McGregor | 280/442 |
| 4,988,115 | 1/1991 | Steinke | 280/404 |
| 5,011,177 | 4/1991 | Grice | 280/491.2 |
| 5,035,439 | 7/1991 | Petrillo . | |
| 5,244,226 | 9/1993 | Bergh . | |
| 5,269,546 | 12/1993 | Pollock et al. . | |
| 5,320,376 | 6/1994 | Bojarski et al. | 280/442 |
| 5,326,128 | 7/1994 | Cromley, Jr. | 280/723 |
| 5,364,113 | 11/1994 | Goertzen . | |

FOREIGN PATENT DOCUMENTS

| | | | |
|---|---|---|---|
| 2245235 | 1/1992 | United Kingdom | 280/442 |

OTHER PUBLICATIONS

Elliott, Ben G. et al., "The Gasoline Automobile," *Engineering Education Series*, Fifth Edition, pp. 540–542, (1939).

*Primary Examiner*—Mitchell J. Hill
*Attorney, Agent, or Firm*—Merchant, Gould, Smith, Edell, Welter & Schmidt

[57] ABSTRACT

A trailer is provided having a support frame and a steering axle. The trailer is interconnected to a tow vehicle. The steering axle is rotatable between a first position providing positive caster and a second position providing negative caster.

15 Claims, 10 Drawing Sheets

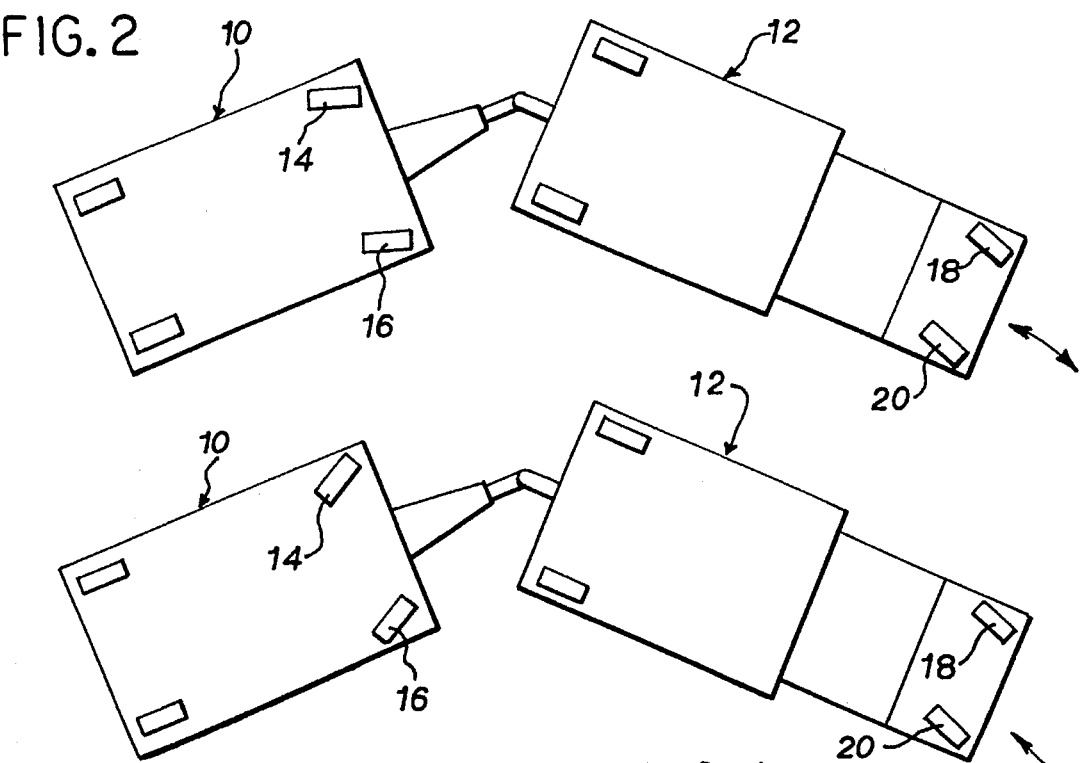
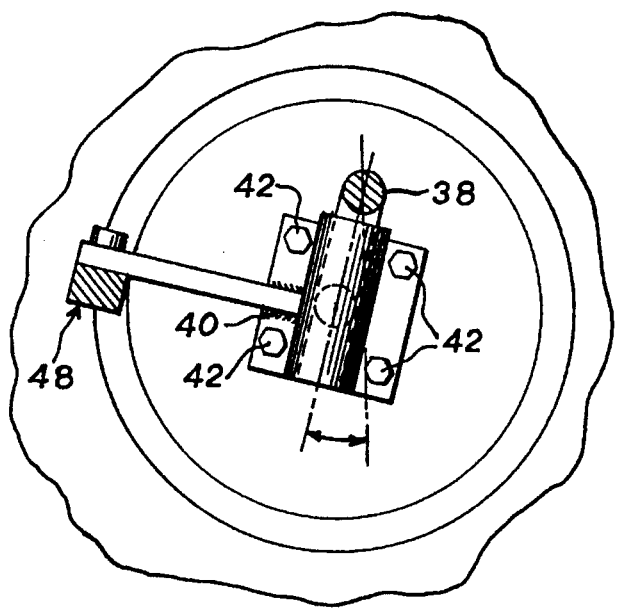

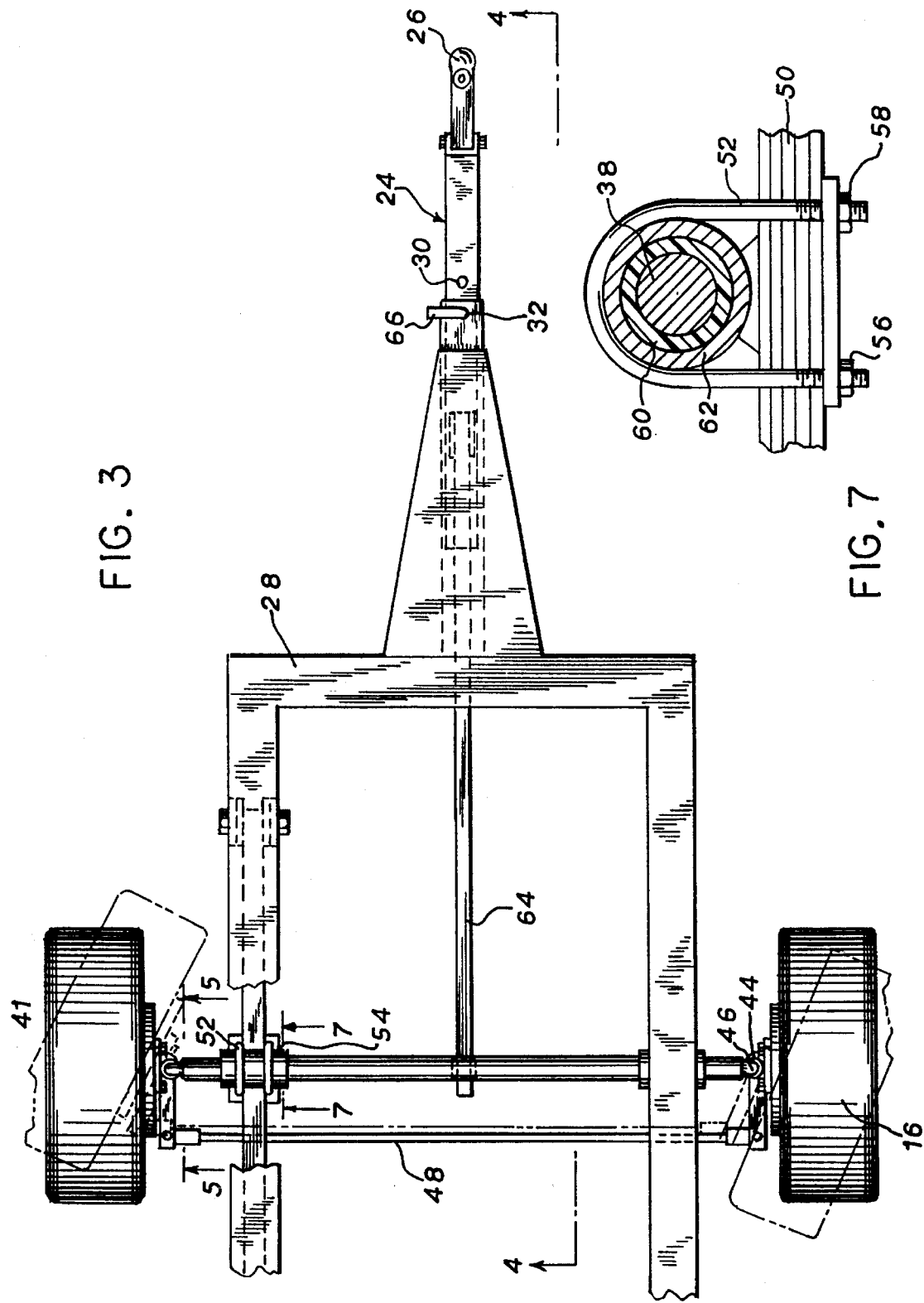

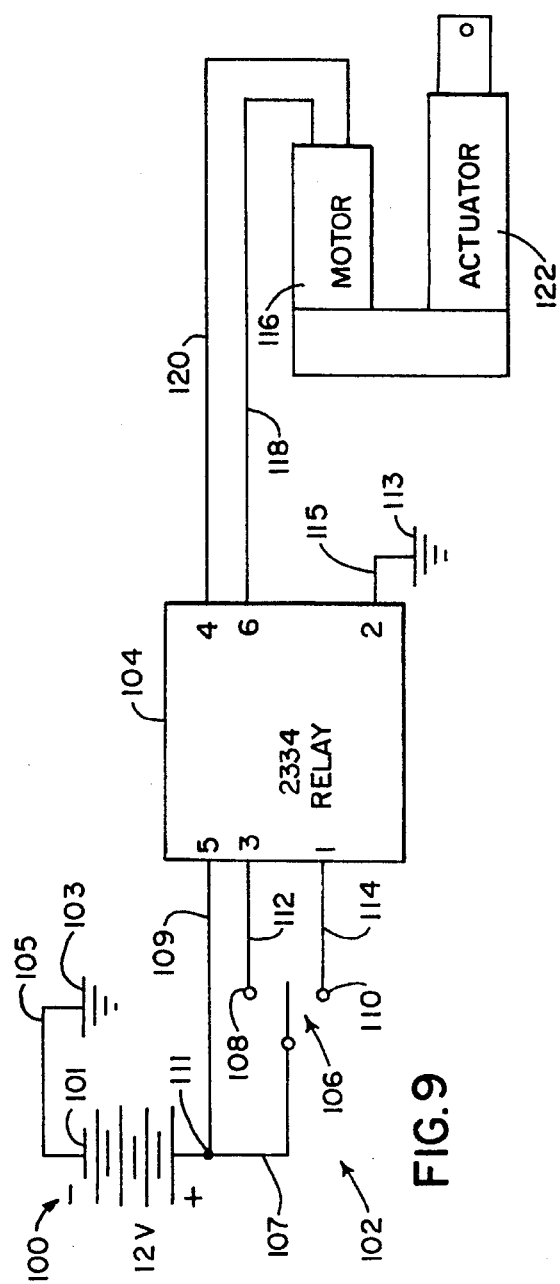
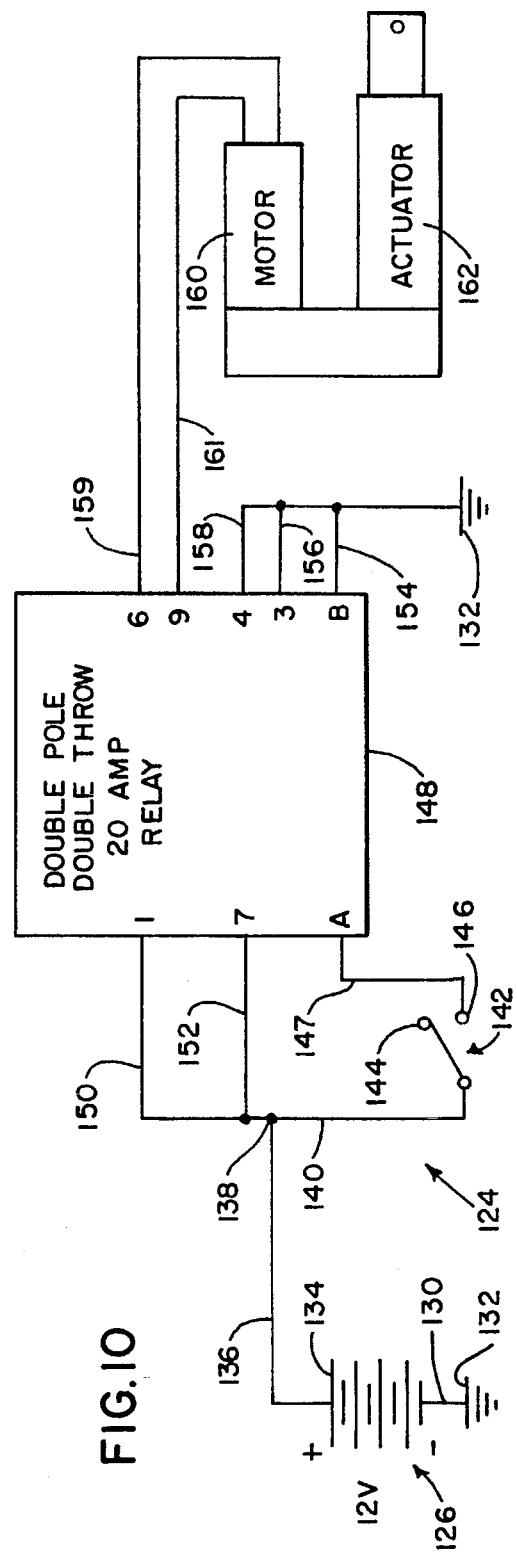
FIG.9
FIG.10

5,474,320

TRAILER

This is a continuation-in-part application of application Ser. No. 07/917,822, filed Jul. 21, 1992, now U.S. Pat. No. 5,320376.

BACKGROUND OF THE INVENTION

This invention relates generally to trailers, and more particularly to a trailer wherein the steering wheels of the trailer follow the steering wheels of a tow vehicle when the tow vehicle moves in both a forward and a reverse direction.

Typically, the steering wheels of a standard trailer will follow the steering wheels of a tow vehicle when the tow vehicle is moving in the forward direction. However, when the tow vehicle backs up the steering wheels of the trailer turn the wrong way, thereby jack-knifing the trailer and the tow vehicle. This invention is directed toward a trailer wherein the trailer steering wheels follow the steering wheels of the tow vehicle when the tow vehicle moves in both a forward and a reverse direction.

Previous attempts at trailer steering devices can be seen in Winchester U.S. Pat. No. 2,498,779, which pertains to a self guiding trailer dolly having a connection for easy backing; Horseman et al U.S. Pat. No. 4,405,147, directed to a low tongue weight, wagon type, trailer with antijack-knife steering for backing the trailer; and Stoddard U.S. Pat. No. 4,463,966 describing an antijack-knife, hay wagon type trailer.

SUMMARY OF THE INVENTION

The invention is a method and device for allowing the steering wheels of a trailer to follow the steering wheels of a tow vehicle when the tow vehicle moves in both a forward and a reverse direction. The invention allows the user to rotate the steering axle of the trailer from a positive caster to a negative caster and vice versa. When the steering axle of the trailer is in a positive caster, the steering wheels of the trailer will follow the steering wheels of the tow vehicle when the tow vehicle is moving forward. Likewise, when the steering axle of the trailer is in a negative caster, the steering wheels of the trailer will follow the steering wheels of the tow vehicle, when the tow vehicle moves in a reverse direction. In both cases, the steering wheels of the trailer turn direction in unison with the turning of the tow vehicle steering wheels.

The device is comprised of a tongue which interconnects the trailer and the tow vehicle. The tongue is movable between two positions, a forward and a rearward position. A connector rod is secured to the steering axle and pivotally mounted to the tongue. When the tongue is in the forward position, the connecting rod forces the trailer's steering axle to rotate to a positive caster. When the tongue is located in the negative position, the connecting rod forces the trailer steering axle to rotate to a negative caster. In the preferred embodiment, the tongue is maintained in either the forward or rearward position by means of a pin which extends through the frame of the trailer and the tongue.

It is therefore a primary objective of this invention to develop a trailer having a means for moving a steering axle between a first position providing a positive caster and second position providing a negative caster.

It is a further objective to provide a method for having the steering wheels of a trailer follow the steering wheels of a tow vehicle to which the trailer is attached.

A still further objective is to provide a trailer wherein the trailer steering wheels follow the steering of a tow vehicle moves in both a forward and reverse direction.

These and other objectives will become evident throughout this disclosure.

BRIEF DESCRIPTION OF THE DRAWINGS

FIG. 1 is a top view of the prior art trailer in operation;

FIG. 2 is a top view of the invention;

FIG. 3 is an upper plan view of the invention;

FIG. 7 is a sectional view of the trailer steering axle and its suspension; and

FIG. 8 is a sectional view showing the steering axle in a negative caster.

FIG. 9 is an electrical schematic of a first actuator system for changing castor of a steering axle.

FIG. 10 is an electrical schematic of a second, additional embodiment of an actuator system for changing castor of a steering axle.

DETAILED DESCRIPTION OF THE DRAWINGS

Figure 4:
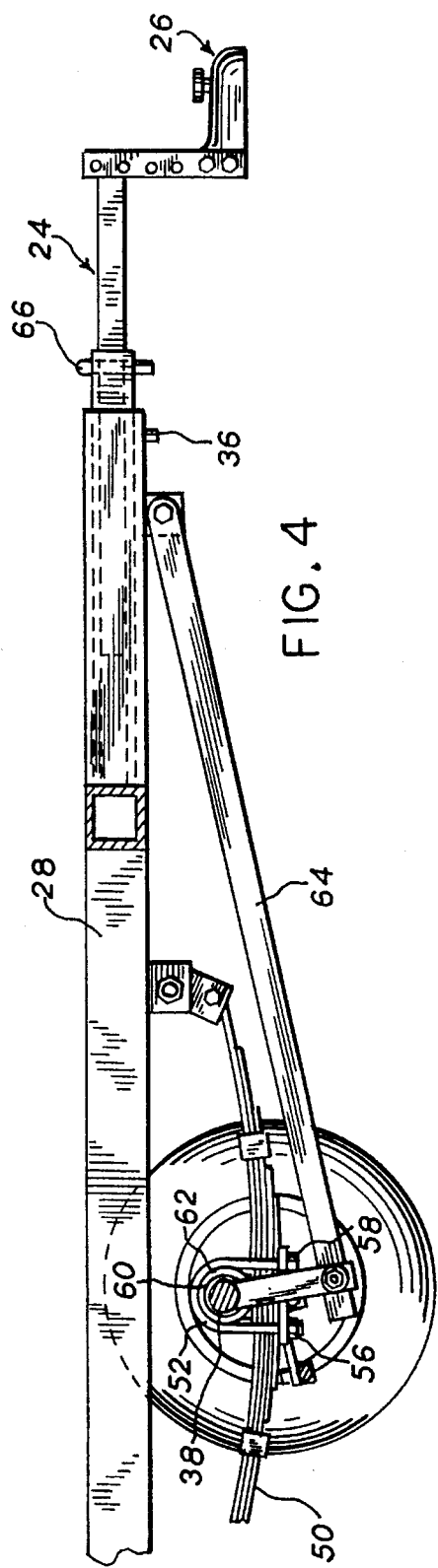
FIG. 4 is a side view of the invention.

The trailer is generally designated by the reference numeral 10. A tow vehicle is generally designated by the reference numeral 12. In the prior art, reversing a trailer 10 could be a nightmarish experience. As shown in FIG. 1, when tow vehicle 12 attempts to back up, the wheels 14, 16 of the trailer 10 turn in a direction opposite to the wheels 18, 20 of the tow vehicle 12, thereby causing trailer 10, and tow vehicle 12 to jack-knife.

The trailer 10 of the present invention may be comprised of a support frame 28 and a tongue 24 having a hitch 26 for attachment of the trailer 10 to a tow vehicle 12. Two apertures 30, 32 extend through tongue 24. Likewise, an aperture 34 extends through support frame 28. The tongue 24 is axially slidable within the frame 28 between a first forward position where apertures 34 and 32 line up and a rearward position where apertures 34 and 30 line up. A stop 36 is provided to prevent tongue 24 from sliding beyond either of the desired positions.

A steering axle 38 is provided to interconnect wheels 14 and 16. Each wheel 14, 16 is connected to the steering axle 38 by means of a bracket 40 which is mounted to each wheel 14, 16 by bolts 42. A socket 44, as best seen in FIG. 3, is provided by bracket 40 for receipt of a king pin 46 located at each end of steering axle 38. A tie rod 48 also interconnects each bracket 40 of wheels 14 and 16. The tie rod 48 insures that the wheels 14, 16 turn in unison.

Steering axle 38 is suspended to support frame 28 by means of the leaf spring system 50. The steering axle 38 is connected to spring 50 by two pairs of U-bolts 52 and 54. The U-bolts 52, 54 extend about the steering axle 38 and through spring 50 and are maintained in position by nuts 56 and 58. A casing 60 with a bearing sleeve 62 within is placed about the axle 38, between the axle and U-bolts 52 and 54. The casing 60 and sleeve 64 arrangement allows axle 38 to rotate while mounted on spring 50.

In the preferred embodiment, tongue 24 and steering axle 38 are interconnected by an L-shaped connecting rod 64. Rod 64 is connected to axle 38 and pivotally mounted to tongue 24.

Figure 6:
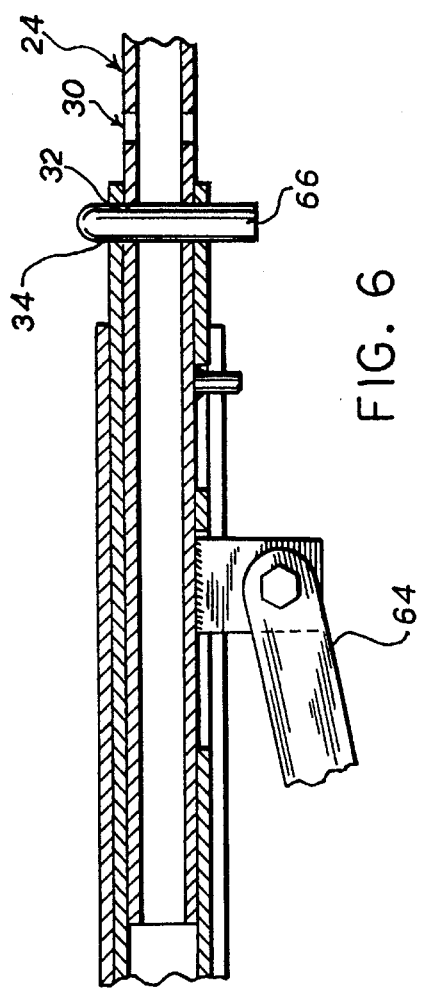
FIG. 6 is a side view of the tongue.
Figure 5:
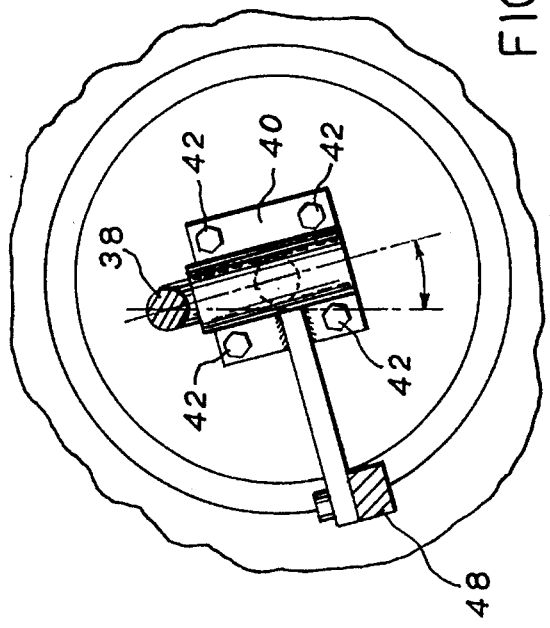
FIG. 5 is a sectional view showing the trailer steering axle in a positive caster.

In use, trailer 10 is connected to tow vehicle 12 by hitch 26. If the tow vehicle 12 is going to be used to pull trailer 10 forward, the user slides tongue 24 axially so as to align apertures 34 and 32, as seen in FIG. 6. A pin 66 is placed within apertures 34 and 32 to maintain the tongue 24 in its position relative to support frame 28. When tongue 24 is in the forward position and apertures 34 and 32 are in alignment, connecting rod 64 rotates steering axle 38 in a counterclockwise direction as shown in FIG. 5, thereby changing the caster to a positive position. As a result, the wheels 14, 16 of the trailer 10 will follow the steering wheels 18, 20 of the tow vehicle 12. Tie rod 48 insures that the wheels 14 and 16 of the trailer 10 turn direction in unison.

When the tow vehicle 12 is used to back up the trailer 10, tongue 24 is axially moved so as to align apertures 34 and 30. Pin 66 is then placed within the apertures to maintain the tongue and support frame in position. The movement of the tongue causes connecting rod 64 to rotate in a clockwise direction, thereby changing the caster to a negative, as depicted in FIG. 8. Being a negative caster, the steering wheels 14, 16 of the trailer 10 will follow the steering wheels 18, 20 of the tow vehicle 12, when the tow vehicle 12 moves in a reverse direction. This can be seen in FIG. 2. As previously discussed, tie rod 48 ensures steering wheels 14, 16 of trailer 10 turn direction in unison.

Referring to FIG. 9, a twelve volt voltage source 100 such as a car battery, is provided to provide power to the actuator system generally designated by the reference numeral 102. The actuator system 102 may be used for rotating the steering axle 38 between a positive caster and a negative caster. The positive terminal 111 of battery 100 is connected by line 109 to terminal 5 of a double pole, double throw relay 104 and to toggle switch 106 by line 107. In the preferred embodiment, a Euramtec 2334 relay is used. The negative terminal 101 of battery 100 is connected to ground 103 by line 105.

The toggle switch 106 may be varied between a first position wherein the switch 106 is closed to terminal 108, a second position wherein switch 106 is not in contact with any terminal, and a third position wherein switch 106 is connected to terminal 110.

Terminal 108 is connected to terminal 3 of the relay 104 by line 112. Terminal 110 of toggle switch 106 is connected to terminal 1 of relay 104 by line 114. Terminal 2 of the relay 104 is connected to ground 113 by line 115.

A reversible motor 116 is provided. Line 118 from the motor is connected to terminal 6 of the relay 104. Line 120 from the motor is connected to terminal 4 of relay 104. The motor 116 drives a linear actuator 122 which in turn is connected to the steering axle 38 in order to rotate the axle 38 between a positive and negative castor.

In operation, toggle switch 106 may be closed to terminal 108 or terminal 110. If the switch 106 is closed to terminal 108, the battery 100 supplies voltage to terminal 3 of relay 104 through lines 107 and 112. Voltage at terminal 3 of relay 104 activates the relay such that voltage is provided to the motor 116 from terminal 4 of relay 104 through line 120. The motor 116 then drives actuator 122 so as to rotate axle 38 to a positive castor. The relay provides voltage to the motor 116 for a period of approximately three (3) seconds, after which, the actuator 122 maintains the axle 38 in a positive castor.

If toggle switch 106 is closed to terminal 110, battery 100 supplies voltage to terminal 1 of relay 104 through lines 107, 114. When voltage is applied to terminal 1 of relay 104, the relay 104 is activated such that a voltage is provided to the motor 116 along line 118 from terminal 6. The relay 104 maintains the voltage to the motor 116 for a period of approximately three seconds. During the period in which the motor is excited, the motor 116 drives the actuator 122 so as to rotate the steering axle 38 to a negative castor. The actuator 122 then maintains the axle 38 in negative castor.

Referring to FIG. 10, a second embodiment is provided of an actuator system 124 for rotating the steering axle between a positive and a negative castor. The actuating system 124 is comprised of a battery 126. connected by line 130 to ground 132. The positive terminal 134 of battery 126 is connected by line 136 to junction 138. Junction 138 is connected by line 140 to switch 142.

Switch 142 has a first terminal 144 and a second terminal 146 which is connected by line 147 to terminal A on a double pole, double throw, 20 amp relay 148 such as the Magna Craft W389CX7. The switch 142 varies between an open position, as shown in FIG. 10, and a closed position wherein terminal 144 is in contact with terminal 146.

Switch 142 is controlled by the shifting of the tow vehicle 12 between forward and reverse gear. When tow vehicle 12 is placed in forward gear, switch 142 is in the open position. When the tow vehicle 12 is in reverse gear, switch 142 is closed such that terminals 144 and 140 are in contact.

Junction 138 is also connected to relay 148 at terminals 1 and 7 by lines 150 and 152 respectively.

Terminals B, 3, and 4 are connected to ground 132 by the lines 154, 156, and 158. Terminals 6 and 9 are connected by lines 159 and 161 to a reversible motor 160 which in turn drives actuator 162. Actuator 162 is provided with internal limiting switches such that the actuator shuts itself off after a predetermined stroke.

In operation, switch 142 is open when the tow vehicle is in forward gear. Voltage is applied to terminals 1 and 7 through lines 150, 152 and 136. Voltage across terminals 1 and 7 activates relay 148. By activating relay 148, terminals 6 and 9 excite motor 100 so as to drive actuator 162 thereby moving the steering axle 38 into a positive castor.

When the tow vehicle 12 is shifted into reverse, switch 142 closes such that terminal 144 closes to terminal 146. Voltage then is applied to terminal A of relay 148 through lines 147, 140, and 136. Voltage at terminal A reverses the direction of motor 160 such that actuator 162 rotates the steering axle 38 to a negative castor. Actuator 162 shuts off after a predetermined stroke due to the internal limiting switches previously discussed.

Figure 11:
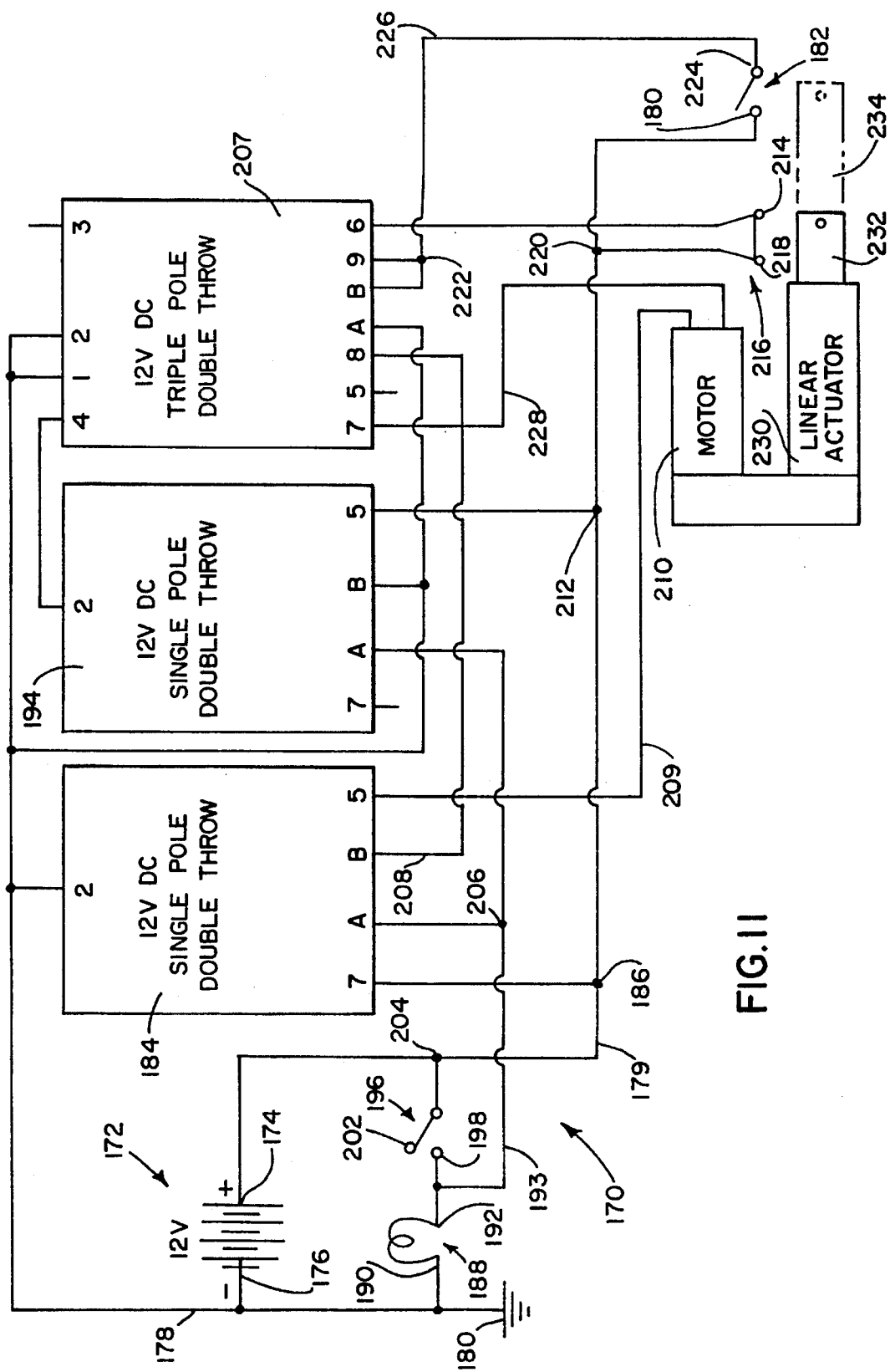
FIG. 11 is an electrical schematic of a third embodiment of an actuator system for changing castor of a steering axle.

Now referring to FIG. 11, a third embodiment of an actuator system is provided and generally designated by the reference numeral 170. The actuator system is comprised of a twelve (12) volt battery 172 having a positive terminal 174 and a negative terminal 176. The negative terminal is connected to line 178 which in turn is connected to ground 180. The positive terminal 174 of the battery 172 is connected to the positive terminal 180 of a normally open proximity switch 182 such as part number 59070010-9272 manufactured by Hamlin.

Terminal 2 of a twelve (12) volt, DC, single pole, double throw relay such as part number KUP-5D55-12 manufactured by Potter and Brumfield is connected to ground by line 178. Terminal 7 of relay 184 is connected to line 179 at junction 186.

A backup light 188 is also provided. The backup light 188 has a first terminal 190 connected to ground via line 178 and a second terminal 192 connected to terminal A of a twelve (12) volt, DC, single pole, double throw relay 194. Relay 194 is identical to relay 184.

The actuator system 120 includes a backup switch 196 having a first terminal 198 connected at junction 200 to line 193 and a second terminal 202 connected to line 179 at junction 204.

Terminal A of the 184 relay is connected to line 193 at junction 206. Terminal B of the relay 184 is connected by line 208 to terminal 8 of a triple pole, double throw relay commercially available as part number KUP-14D55-12 manufactured by Potter and Brumfield. Terminal 5 of relay 184 is connected by line 209 to motor 210.

Terminal B of relay 194 is connected to ground 180 by line 178. Terminal 5 of relay 194 is connected to line 179 at junction 212. Terminal 2 of relay 194 is connected to terminal 4 of relay 207.

Terminals 1 and 2 of relay 207 are connected to ground by line 178. Terminal 3 of relay 207 is unconnected. Terminal 6 of relay 207 is connected to terminal 214 of normally closed proximity switch 216. The normally closed proximity switch 216 is manufactured by Hamlin under part number 59070040-9214. Terminal 218 of proximity switch 216 is connected to line 179 at junction 220.

Terminals B and 9 of relay 207 are tied together at junction 222 and are interconnected to terminal 224 of proximity switch 182 by line 226. Terminal A of relay 207 is connected to ground by line 178. Terminal 5 of relay 207 is unconnected and terminal 7 is connected to motor 210 by line 228.

Motor 210 drives linear actuator 230 between a first position which rotates the steering axle 38 to a positive castor and a second position which rotates the steering axle 38 to a negative castor. The first position is shown in solid line and given the reference numeral 232. The second position providing negative castor is shown in dotted line and given the reference numeral 234.

In operation, when the tow vehicle 12 is shifted from forward to reverse gear, switch 196 closes such that terminal 202 contacts terminal 198. Voltage is provided across terminals 192 and 190 such that the backup light 188 illuminates. Voltage is also supplied to terminal A on both the 184 and 194 relays. By providing voltage to terminal A of each relay 184,194, each relay 184,194 is activated. By activating relay 184, the circuitry in relay 207 closes such that power is applied from terminal 7 through line 228 to motor 210. Motor 210 drives linear actuator 230 such that linear actuator 230 will extend from the first position 232 to the second position 234 wherein the proximity switch 182 closes thereby turning off relay 207. When relay 207 is turned off, power ceases to be applied to motor 210 such that the linear actuator 230 is maintained in the second position 234.

When the tow vehicle 12 is shifted into forward gear, switch 196 opens such that terminals 198 and 202 are not in contact. With relay 207 turned off, power is diverted back into relay 184 so as to excite motor 210 through line 209. Power to motor 210 along line 205 causes the motor 210 to reverse direction thereby causing linear actuator 230 to retract from the second position 234 to the first position 232. When the linear actuator 230 is in the first position 232, normally closed proximity switch 216 opens thereby signaling the relay 207 to shut off the power provided to relay 184. The linear actuator 230 is then maintained in position 232.

Of course, other mechanisms and controls can be used for shifting the caster of the axle without departing from the scope and spirit of the invention.

Figure 12:
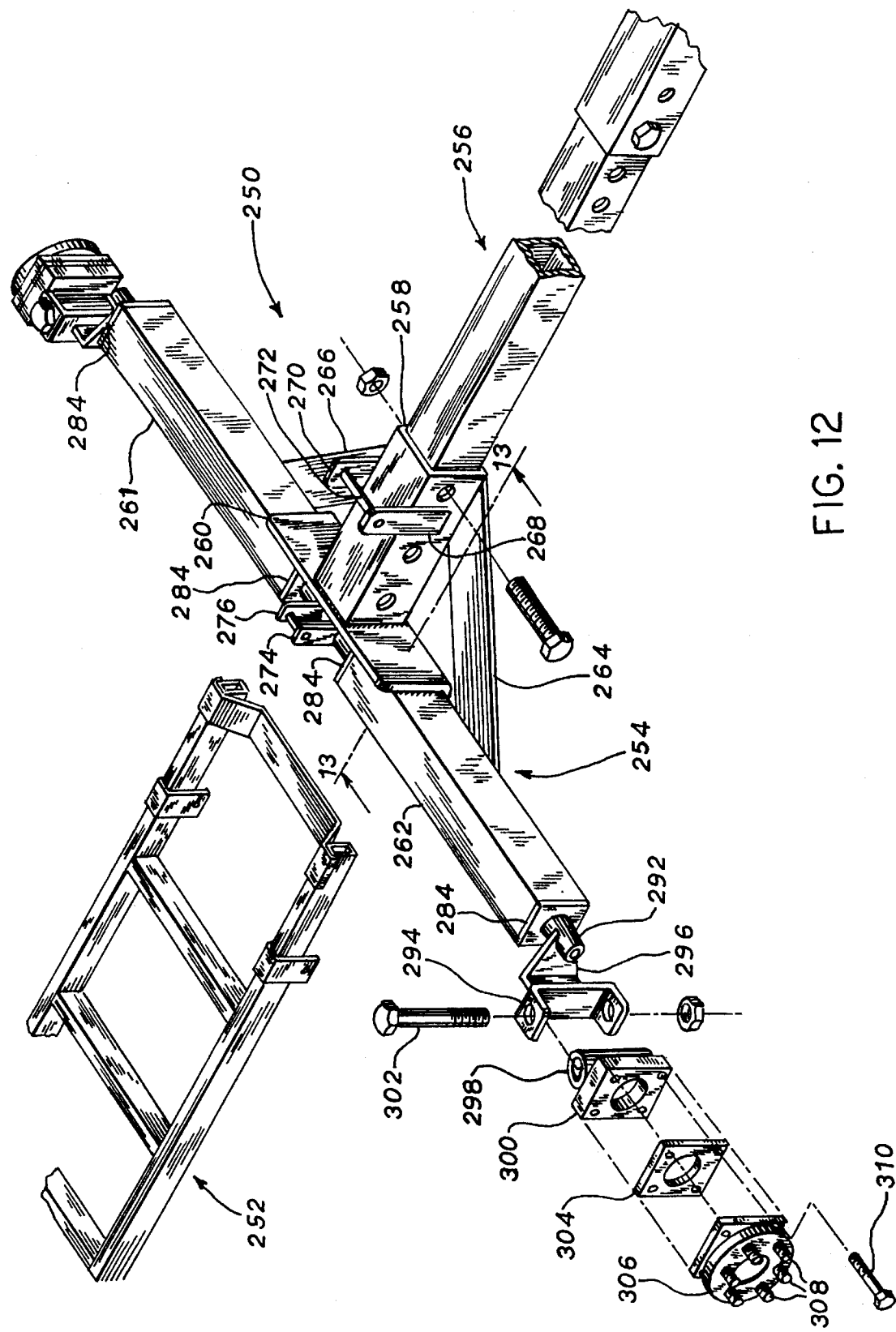
FIG. 12 is an exploded isometric view illustrating a dolly utilizing the castor reversing mechanism of the invention, utilizing a split axle solid bushing construction facilitating ease in serviceability of the axle assembly.

FIG. 12 illustrates a dolly axle assembly 250 consisting of a structural frame 252 adapted for mounting to an axle assembly 254 to which a draw bar 256 is mounted. Draw bar 256 is received within a tubular draw bar receiver 258 connected at its rear end to a vertical plate 260 which, in turn, is connected to first and second of transverse square outer axle tubes 261,262. Outer axle tubes 261,262 are spaced apart, so as to define an opening rearwardly of plate 260.

A pair of brace members 264,266 extend between draw bar receiver 258 and outer axles 261,262.

A pair of vertical arms 268,270 are mounted to opposite sides of draw bar receiver 258 extending upwardly therefrom. A pin 272 extends between the upper ends of arms 268,270.

Figure 13:
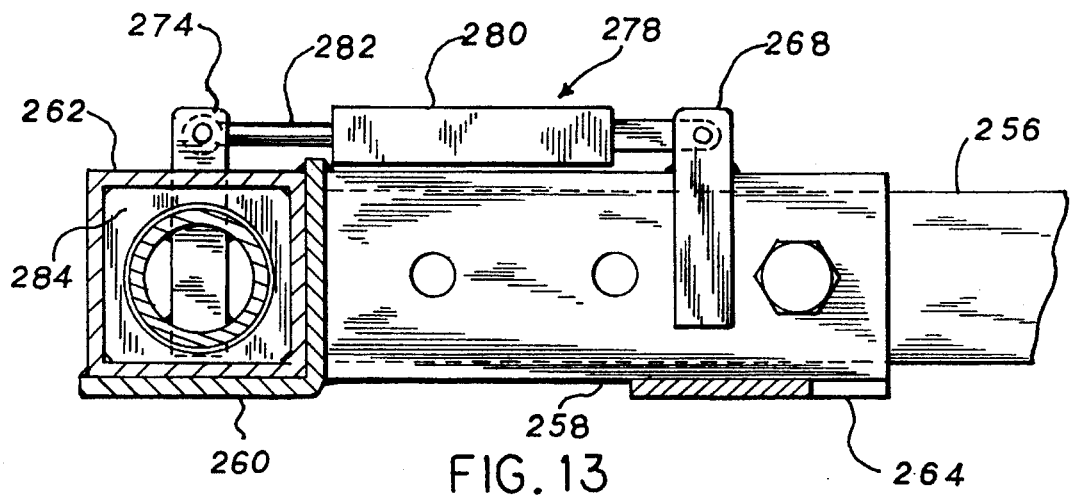
FIG. 13 is a partial side elevation view, with a portion in section, showing a portion of the dolly of FIG. 12.

In a manner as will be explained, first and second split axle sections extend through outer axles 261,262. The split axle sections are separate from each other, and arms 274,276 are mounted to the facing ends of the split axle sections. Arms 274,276 extend through the opening between outer axles 261,262. As shown in FIG. 13, a linear actuator assembly 278 is mounted above draw bar receiver 258. Linear actuator assembly 278 includes a body 280 and an extendable and retractable member 282. Linear actuator body 280 is mounted to pin 272 between arms 268,270. Extendable and retractable member 282 is mounted to both of arms 274,276 adjacent their outer ends. In this manner, extension and retraction of linear actuator movable member 282 results in pivoting movement of the inner split axle sections housed within outer axle 262.

Figures 14, 15:
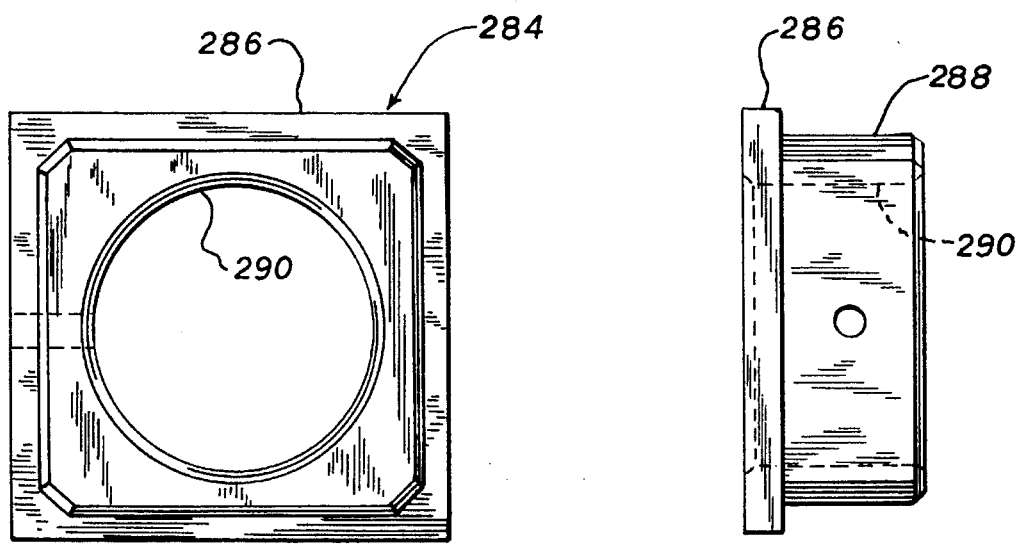
FIG. 14 is a front elevation view of a solid bushing utilized to support the split axle sections in the dolly of FIG. 12.
FIG. 15 is a side elevation view of the bushing of FIG. 14.

Referring to FIG. 12, each inner split axle section is mounted adjacent each of its ends within a bushing 284, to rotatably mount the axle sections within outer axles 261,262. The construction of bushing 284 is illustrated in FIGS. 14 and 15. As shown, each bushing 284 includes a face plate 286 and a rectangular rearward extension 288. A circular passage 290 extends through face plate 286 and extension 288, for receiving one end of one of the round tubular split axle sections contained within inner axles 261,262.

As shown in FIG. 12, the outer end of one of the split axle sections is shown at 292. A strut assembly 294 is mounted via a bracket 296 to outer axle end 292, and a knuckle tube 298 having a mounting plate 300 connected thereto is pivotally mounted to strut 294 via a bolt 302. A face plate 304 is located between mounting plate 300 and a hub 306 which includes outwardly extending studs 308 for mounting a wheel. A series of bolts 310 are employed to mount hub 306 to mounting plate 300, so as to pivotably secure the wheel to axle assembly 254.

The split axle section on the opposite side of axle assembly 254 includes wheel-mounting components identical to those described immediately above for mounting a wheel to the opposite side of axle assembly 254.

Figure 16:
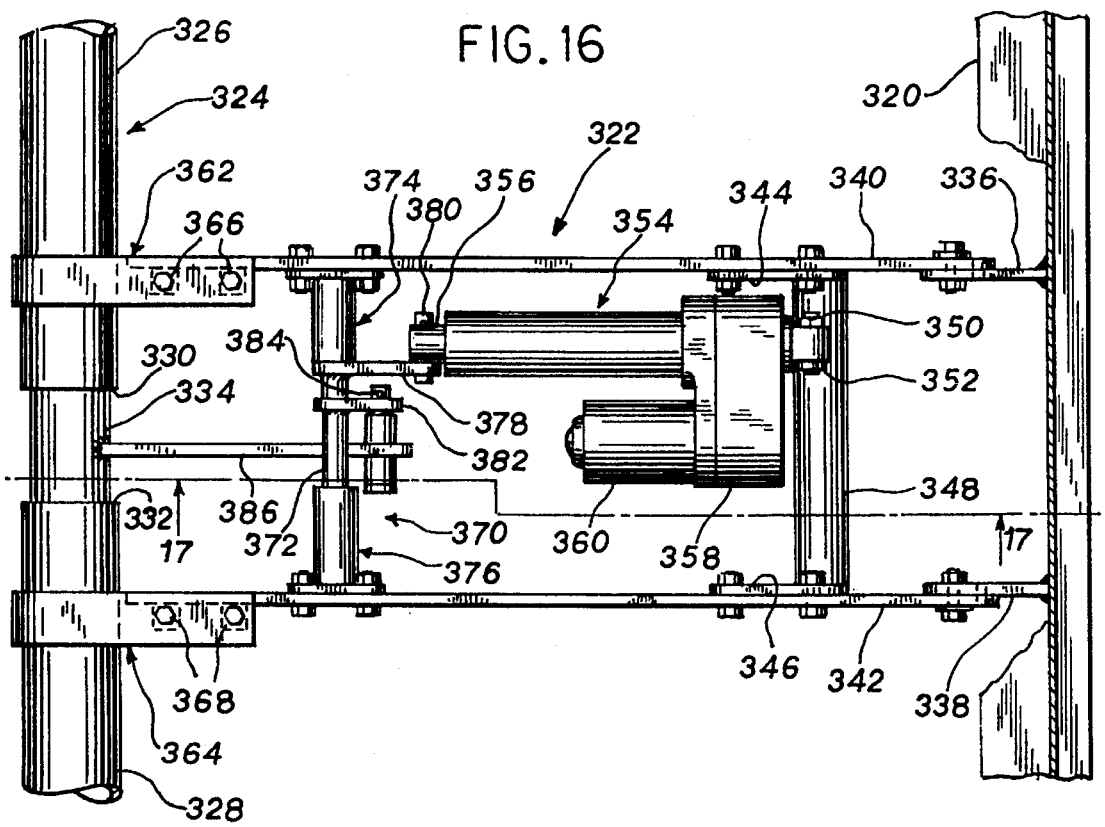
FIG. 16 is a partial plan view of another embodiment of the reversible castor axle assembly constructed according to the invention, showing an adaptation of the invention for use in connection with a trailer and incorporating a linear actuator for moving the axle between a forward castor and a reverse castor position.
Figure 17:
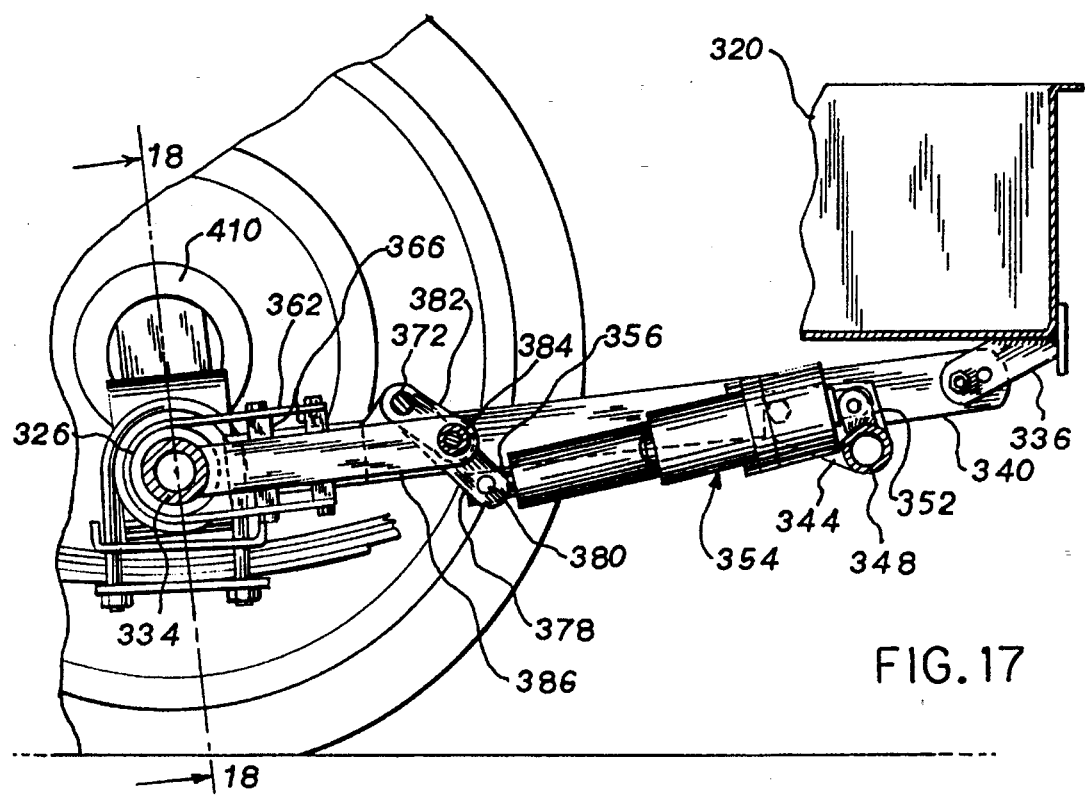
FIG. 17 is a partial longitudinal sectional view, with portions removed, of the reverse castor assembly of FIG. 16.

FIGS. 16 and 17 illustrate an alternative embodiment incorporating the reversible caster feature of the invention to provide a movement of the axle between a positive caster and a negative caster position, such as for use in connection with a trailer, or the like. In FIG. 16, a transverse frame member of the trailer is illustrated at 320. An actuator assembly 322 is interposed between frame member 320 and an axle assembly 324, which includes a pair of split axle sections 326,328. Split axle sections 326,328 are in the form of circular tube sections defining facing ends 330,332. A connecting shaft 334 extends between and interconnects split axle sections 326,328. Bolts (not shown) extend between aligned openings in split axle sections 326,328 and passages in connecting shaft 334 for non-rotatably securing connecting shaft 334 to split axle sections 326,328. With this arrangement, axle assembly 324 is easily serviced, enabling an operator to remove one of axle sections 326,328 without removing the other by removing the appropriate bolts and sliding the desired axle section off of connecting shaft 334.

As shown in FIGS. 16 and 17, a pair of ears 336,338, are mounted to the web of frame cross member 320. A pair of arms 340,342 are non-rotatably secured to ears 336,338 via conventional nut and bolt assemblies. Preferably, each ear includes a slot and a pair of bolts extend through the slot to prevent pivoting movement of arms 340,342.

A pair of brackets 344,346 are mounted to arms 340,342 and a tube 348 extends between brackets 344,346. A pair of ears 350,352 are mounted to tube 348, and one end of a linear actuator assembly 354 is pivotally mounted between ears 350,352. Linear actuator assembly 354 is adapted for actuation in a manner as explained previously, and includes an extendable and retractable member 356, a base 358 and a motor 360.

The ends of arms 340 adjacent axle assembly 324 are mounted to split axle sections 326,328 by a pair of U-shaped bearing members 362,364, respectively. Each of bearing members 362,364 defines an upper leg and a lower leg, and the inner ends of axle sections 326,328 extend through the space between the upper and lower legs of bearing members 362,364, respectively. Spacers 366 extend between the upper and lower legs of the bearing member 362 and spacers 368 extend between the upper and lower legs of bearing member 364. Nuts and bolts extend through aligned openings in the upper and lower legs of bearing members 366,368 and through aligned passages formed in spacers 336,368, respectively, to secure bearing members 362,364 to axle sections 326,328, respectively.

A bell crank assembly, shown generally at 370, is disposed between arms 340,342 and interconnected with extendable and retractable member 356 of linear actuator assembly 354. Bell crank assembly 370 includes a transverse rod 372 rotatably housed within a pair of bushings 374,376 mounted to arms 340,342, respectively. A link 378 is interconnected at one end with rod 372 and at its opposite end with a pin 380 mounted to extendable and retractable member 356 of linear actuator assembly 354, for selectively rotating rod 372 in response to operation of linear actuator assembly 354. A second link, shown at 382, is connected at one end to rod 372 and at its other end to a pin 384, and through pin 384 to an actuator bar 386 mounted to connecting shaft 334. With this arrangement, operation of linear actuator assembly 354 results in pivoting movement of rod 372 which, in turn, causes rotation of connecting shaft 334 through link 382, pin 384 and actuator bar 386. In a manner as described previously, such operation functions to shift the caster of axle assembly 324 between a positive caster and a negative caster position, according to the direction of operation of the vehicle behind which the trailer is being towed.

The pivotable mounting of linear actuator assembly 354 enables the wheels of the trailer to bounce up and down in response to road conditions without linear actuator assembly 354 functioning to change the caster of axle assembly 324. That is, linear actuator assembly 354 essentially "floats" along with axle assembly 324 during upward and downward movement resulting from the trailer tires striking an obstruction in the road or moving vertically for any other reason.

Figure 18:
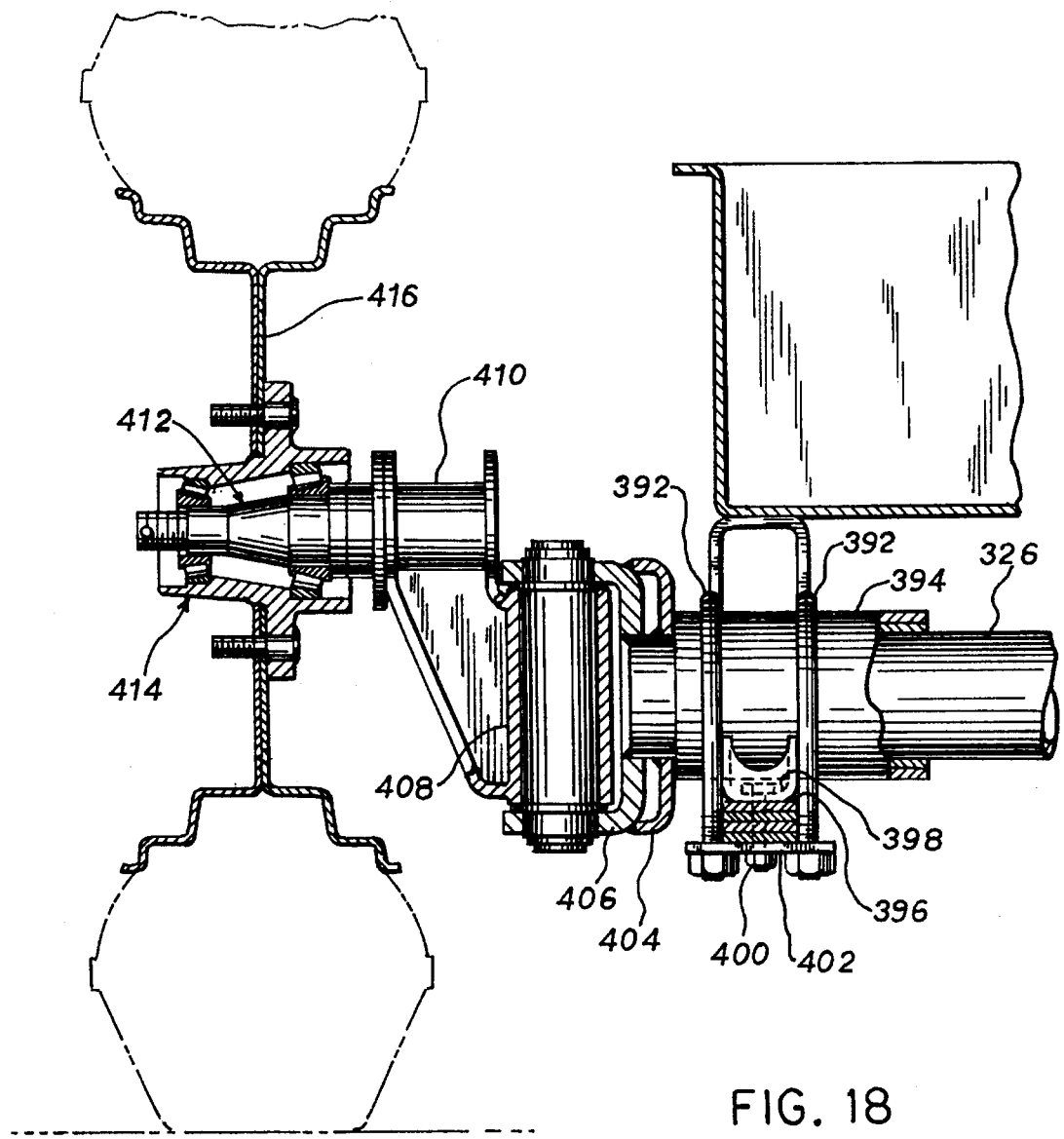
FIG. 18 is a partial elevation view, with portions in section, showing one end of the reversible castor axle assembly of FIGS. 16 and 17.

FIG. 18 illustrates the manner in which the trailer wheels are mounted to the axle sections, such as axle section 326, which is substantially as described previously. As shown in FIG. 18, a pair of U-bolts 390,392 function to secure a cylindrical bushing 394 to the leaf spring of the trailer, shown generally at 396. A cradle 398 is also secured to leaf spring 396 via a nut and bolt assembly 400 which cooperates with a plate 402 to mount bushing 394 to leaf spring 396. With this arrangement, bushing 394 is clamped between u-bolts 392 and cradle 398. A reverse C-shaped mounting member 404 is connected to the end of bushing 394, and a strut 406 is mounted to mounting member 404. A knuckle 408 is pivotably mounted between the upper and lower legs of strut 406 and a wheel-supporting flange 410 is connected to knuckle 408. An axle stub 412 is mounted in a conventional manner to flange 410, and a hub 414 is mounted to axle stub 412 for mounting a wheel 416.

The embodiment of FIGS. 16–18 provides a split-axle construction which facilitates servicing of axle assembly 324. The operator only needs to loosen the appropriate bolts connecting the axle section with connecting shaft 334 in order to remove the desired axle section without the need for removing the other axle section.

Figure 19:
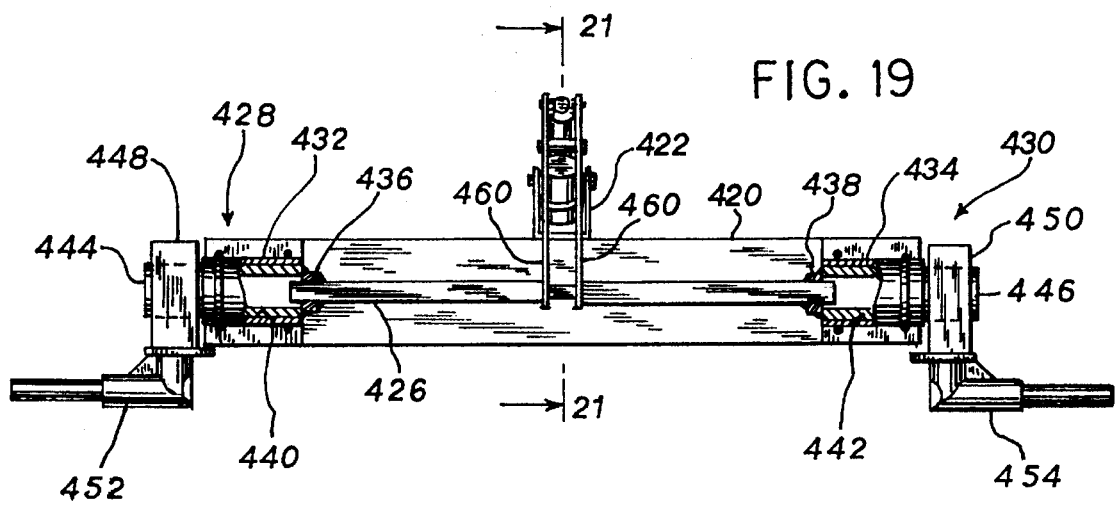
FIG. 19 is a front elevation view of another embodiment of a reversible castor axle assembly constructed according to the invention.
Figure 20:
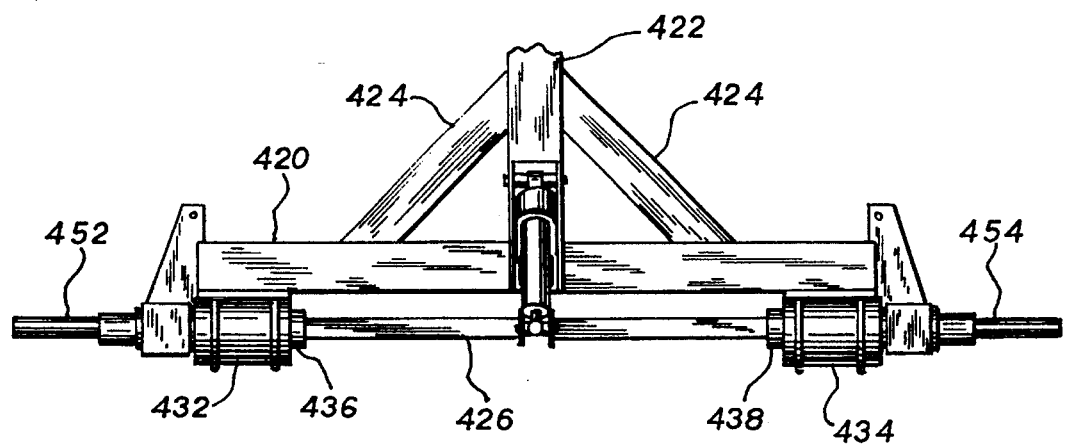
FIG. 20 is a top plan view of the reversible castor axle assembly of FIG. 19.
Figure 21:
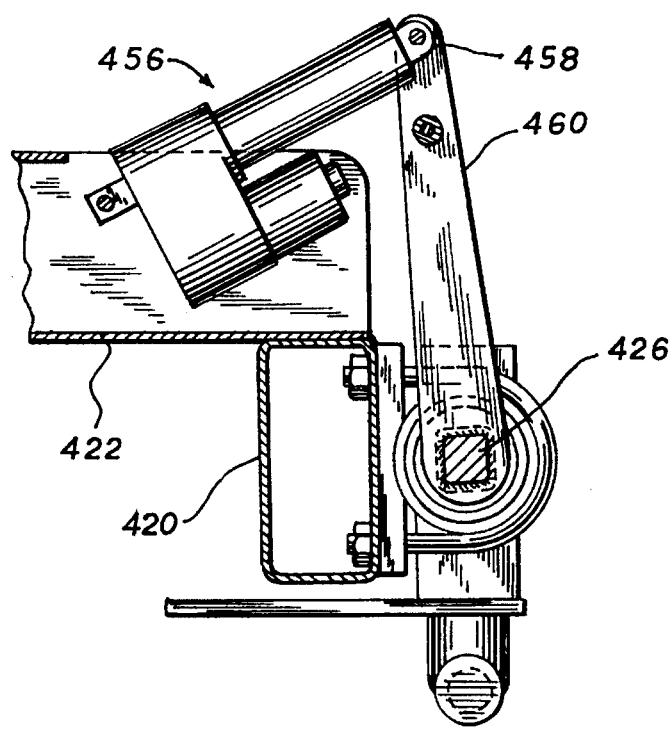
FIG. 21 is a partial longitudinal sectional view of the reversible castor axle assembly of FIGS. 19 and 20.

FIG. 19 illustrates an embodiment of the invention adapted for use in connection with a towed vehicle, such as a farm wagon. In FIGS. 19–21, the farm wagon structure includes frame members 420,422 and 424. The reversible caster mechanism of the invention includes a square shaft 426 which extends between and interconnects stub axle assemblies 428,430 mounted to opposite ends of frame member 420. Stub axle assembly 428 includes a round tubular bushing 432 mounted to frame member 420, such as by U-clamps or the like. Stub axle assembly 430 similarly includes a round cylindrical bushing 434 mounted to frame member 420 in a similar manner.

The ends of connecting shaft 426 are received within passages defined by plugs 436,438, which in turn are welded to axle stubs 440,442, respectively. Axle stubs 440,442 define spindles 444,446, respectively, to which wheel mounting members 448,450, respectively, are mounted. Wheel-mounting stub axles 452,454 are mounted to wheel mounting members 448,450, respectively.

As shown in FIG. 21, a linear actuator assembly 456 is mounted to frame member 420. Linear actuator assembly 456 includes an extendable and retractable member 458 which is connected to one end of each actuator rod 460, the other ends of which is non-rotatably secured to connecting rod 426. With this arrangement, operation of linear actuator assembly 456 to extend and retract member 458 results in movement of actuator bar 460 between its positions shown in FIG. 21. Rotation of connecting shaft 426 results in pivoting movement of spindles 444,446 and wheel mounting members 448,450, respectively, to change the caster of axle assemblies 428,430 between a positive caster and a negative caster, as described previously. Linear actuator assembly 456 is actuated in a manner as previously described according to the direction of operation of the vehicle behind which the wagon is being towed.

Again, the assembly of FIGS. 19–21 facilitates servicing of one of stub axle assemblies 428,430 without the need for removing the other, simply by removing the bolt by which connecting shaft 426 is secured to plug members 436,438 and sliding stub axles 440,442 outwardly relative to bushing 432,434, respectively.

It can be seen from the above description, that the invention accomplishes at least all of its stated objectives. It is recognized that various alternatives and equivalents are possible without deviating from the spirit of this invention as set forth in the following claims.

We claim:

1. A trailer having a support frame and a steering axle, the trailer connectable to a tow vehicle having a forward gear and a reverse gear, comprising:

a power source;

a switch operatively connected to the power source, wherein the switch is controlled between a first forward position and a second rearward position in response to the shifting of the tow vehicle between forward gear and reverse gear;

a linear actuator having an arm connected to the steering axle, the arm movable between a first forward position in response to the switch in the first forward position and a second rearward position in response to the switch in the second rearward position;

a reversible motor operatively connected to the linear actuator, the motor rotatable in a first forward direction and in a second rearward direction; and a relay operatively connecting the motor and the switch wherein the motor rotates in the forward direction for a predetermined time period when the switch is in the forward position and the motor rotates in a rearward direction for a predetermined period of time when the switch is in the rearward position.

2. The device of claim 1 further comprises:

a first proximity switch which deactivates the motor when the arm of the linear actuator is in the first forward position; and a second proximity switch which deactivates the motor when the arm of the linear actuator is in the second rearward position.

3. The device of claim 1 further comprising:

first and second square outer axles tubes interconnected to each other, the first and the second square outer axle tubes spaced apart so as to define an opening;

a first split axle section extending through the first square outer axle tube and a second split axle section extending through the second square outer axle tube;

a linear actuator connected to the first and second split axle sections at the opening between the first and second square axle tubes, the linear actuator operative in moving the first and second split axle sections between a first position and a second position;

a first bushing for rotatably mounting the first split axle section to the first square outer axle tube; and a second bushing for rotatably mounting the second split axle section to the second square outer axle tube.

4. The device of claim 3 wherein the first and second split axle sections are connected by a connecting shaft, and the linear actuator is connected to the connecting shaft.

5. The device of claim 4 further comprising:

a first spring affixed to the support frame for suspending the first split axle section;

a second spring affixed to the support frame for suspending the second split axle section;

a plurality of U-bolts for maintaining the first split axle section on the first spring and for maintaining the second split axle section on the second spring;

means for interconnecting the U-bolts to the first spring and to the second spring;

a first bearing sleeve placed about the first split axle section between the first split axle section and the U-bolts; and a second bearing sleeve placed about the second split axle section between the second split axle section and the U-bolts.

6. The device of claim 3 wherein the steering axle further comprises:

a first stub axle assembly removably connected to the first bushing attached to the first split axle at the first end of the square shaft;

a second stub axle assembly removably connected to the second bushing attached to the second split axle at the second end of the square shaft.

7. A trailer including a support frame, a steering axle, and first and second steering wheels, the trailer connectable to a tow vehicle having a forward gear and a reverse gear, comprising:

a tie rod interconnecting each of the steering wheels;

a linear actuator having an arm connected to the steering axle;

means for moving the arm of the linear actuator between a first forward position providing a positive caster to the steering axle, and a second rearward position providing a negative caster to the steering axle in response to the shifting of the tow vehicle between the forward gear and the reverse gear; wherein the means for moving includes a power source, a reversible motor connected to the linear actuator, the motor rotatable in a first forward direction so as to move the arm of the linear actuator toward the first forward position and rotatable in a second rearward direction so as to move the arm of the linear actuator toward the second rearward position and a switch operatively connecting the power source and the reversible motor, the switch movable between a first forward position wherein the motor rotates in the first forward direction and a second rearward position wherein the motor rotates in a second rearward direction in response to the tow vehicle shifting between forward gear and reverse gear, a first proximity switch operatively connected to the motor, the first proximity switch preventing forward rotation of the motor when the tow vehicle is in forward gear and the arm of the linear actuator is in the forward position and a second proximity switch operatively connected to the motor, the second proximity switch preventing reverse rotation of the motor when the arm of the linear actuator is in the second rearward position and the tow vehicle is in reverse gear.

8. The device of claim 7 wherein the steering axle comprises:

first and second outer axle tubes interconnected to each other;

a first split axle section extending through the first outer axle tube and a second split axle section extending through the second outer axle tube; and means for interconnecting the first and second split axle sections to the linear actuator.

9. The device of claim 8 further comprising:

a first bushing for rotatably mounting the first split axle section to the first square outer axle tube; and a second bushing for rotatably mounting the second split axle section to the second square outer axle tube.

10. The device of claim 9 further comprising:

a first spring affixed to a support frame for suspending the first split axle section;

a second spring affixed to a support frame for suspending the second split axle section;

a plurality of U-bolts for maintaining the first split axle section on the first spring and for maintaining the second split axle section on the second spring;

means for interconnecting the U-bolts to the first spring and to the second spring;

a first bearing sleeve placed about the first split axle section between the first split axle section and the U-bolts; and a second bearing sleeve placed about the second split axle section between the second split axle section and the U-bolts.

11. The device of claim 7 wherein the steering axle comprises a square shaft having a first end and a second end;

a first stub axle assembly removably connected to the first end of the square shaft;

a second stub axle assembly removably connected to the second end of the square shaft;

a first bushing for interconnecting the first stub axle to the support frame, the stub axle rotatable within the first bushing; and a second bushing for connecting the second stub axle to the support frame, the second stub axle rotatable within the second bushing.

12. A trailer having a support frame and a steering axle, the trailer connectable to a tow vehicle having a forward gear and a reverse gear, the trailer comprising:

an axle supported from the support frame by a spring suspension;

a linear actuator assembly, having a first end and a second end and a bell crank assembly, the first end pivotally attached to the support frame and the second end attached to the axle, whereby the linear actuator assembly moves the axle from a positive caster position to a negative caster position.

13. A trailer as in claim 12, wherein the axle comprises a connecting shaft and first and second split axle section, wherein the first and second split axle section is connected by the connecting shaft, and the second end of the linear actuator assembly is attached to the connecting shaft.

14. A trailer as in claim 13, wherein the spring suspension comprises first and second screen springs.

15. A trailer as in claim 14 wherein the bell crank assembly further comprises:

first and second arms, the first and second arms each having a first end and a second end, the first ends non-rotatably secured to the support frame and the second ends attached to the first and second split axle sections;

a linear actuator having a body and an extendable member, the body pivotally attached between the first and second arms;

a linkage connecting the extendable member to the connecting shaft.

* * * * *